US007857114B2

(12) United States Patent
Hamasaki

(10) Patent No.: US 7,857,114 B2
(45) Date of Patent: Dec. 28, 2010

(54) BANKNOTE DISCRIMINATION APPARATUS AND BANKNOTE DISCRIMINATION METHOD

(75) Inventor: Hiroki Hamasaki, Himeji (JP)

(73) Assignee: Glory, Ltd., Himeji-Shi (JP)

(*) Notice: Subject to any disclaimer, the term of this patent is extended or adjusted under 35 U.S.C. 154(b) by 190 days.

(21) Appl. No.: 12/168,317

(22) Filed: Jul. 7, 2008

(65) Prior Publication Data

US 2010/0000838 A1 Jan. 7, 2010

(51) Int. Cl.

*G07F 7/04* (2006.01)
*G06K 7/00* (2006.01)
*G06K 9/00* (2006.01)
*G07D 7/00* (2006.01)

(52) U.S. Cl. .................................... 194/207; 382/135

(58) Field of Classification Search ................ 194/206, 194/207, 328–333, 344; 209/534; 382/135, 382/136

See application file for complete search history.

(56) References Cited

U.S. PATENT DOCUMENTS

| | | | | |
|---|---|---|---|---|
| 5,662,201 | A | 9/1997 | Gerlier et al. | |
| 5,964,336 | A | 10/1999 | Itako et al. | |
| 6,142,284 | A * | 11/2000 | Saltsov | 194/207 |
| 6,170,631 | B1 * | 1/2001 | Miyazaki | 194/200 |
| 6,677,603 | B2 | 1/2004 | Yanagiuchi | |
| 6,883,707 | B2 | 4/2005 | Nagasaka et al. | |

FOREIGN PATENT DOCUMENTS

| | | | |
|---|---|---|---|
| JP | 59-120857 | A1 | 7/1984 |
| JP | 63-301393 | A1 | 12/1988 |
| JP | 03-209594 | A1 | 9/1991 |
| JP | 05-101252 | A1 | 4/1993 |
| JP | 07-107506 | B2 | 11/1995 |
| JP | 08-110967 | A1 | 4/1996 |
| JP | 09-237362 | A1 | 9/1997 |
| JP | 09-305821 | A1 | 11/1997 |
| JP | 10-031774 | A1 | 2/1998 |
| JP | 10-031775 | A1 | 2/1998 |
| JP | 10-040436 | A1 | 2/1998 |
| JP | 10-154256 | A1 | 6/1998 |
| JP | 411083559 | A * | 3/1999 |
| JP | 2001-195629 | A1 | 7/2001 |
| JP | 2002-277441 | A1 | 9/2002 |
| JP | 2004-021867 | A1 | 1/2004 |
| JP | 2004-213559 | A1 | 7/2004 |
| JP | 2004-213560 | A1 | 7/2004 |
| JP | 2004-280367 | A1 | 10/2004 |

OTHER PUBLICATIONS

Translation of JP 411083559A.*

* cited by examiner

*Primary Examiner*—Jeffrey A Shapiro
(74) *Attorney, Agent, or Firm*—Burr & Brown

(57) ABSTRACT

A banknote discrimination apparatus includes bodies and a plurality of sensors each detachably provided to the bodies and adapted for detecting a banknote. The banknote discrimination apparatus further includes a control unit adapted for discriminating the banknote, based on detection information detected by each sensor. The control unit is configured to discriminate the banknote, by using the detection information detected by one of the plurality of sensors, which is newly attached to one of the bodies, in addition to the detection information detected by the sensor or sensors already attached to the bodies, if the one of the plurality of sensors is attached to the one of the bodies.

7 Claims, 10 Drawing Sheets

BANKNOTE DISCRIMINATION APPARATUS AND BANKNOTE DISCRIMINATION METHOD

FIELD OF THE INVENTION

The present invention relates to a banknote discrimination apparatus and a banknote discrimination method, each for use in discrimination of banknotes.

BACKGROUND ART

In a banknote handling machine configured for taking therein the banknotes from an exterior of a case thereof and then handling the banknotes taken therein, the banknote discrimination apparatus is incorporated, which is adapted for discriminating the denomination, authenticity, fitness, new or old version, or the like of each banknote. As the banknote discrimination apparatus of this type, for example, those described in JP10-31774A and the like, have been known.

Specifically, in the banknote discrimination apparatus, a line sensor(s), a magnetic sensor(s), a fluorescent sensor(s) or the like are provided, such that various detection processes can be performed by using such sensors. Thus, the denomination, authenticity, fitness, new or old version, or the like of each banknote can be discriminated based on information detected by such sensors (i.e., information obtained from the detection processes).

SUMMARY OF THE INVENTION

However, in this conventional banknote discrimination apparatus, optional addition and/or removal of such various sensor(s) is not quite easy. Specifically, when a magnetic sensor is newly added to such a banknote discrimination apparatus that has been already installed without any magnetic sensor provided therein, for example, because new banknotes are issued, the design for such a banknote discrimination apparatus must be done over again from the beginning. Thus, in such a conventional banknote discrimination apparatus, it is considerably difficult to provide an upgrading process and/or downgrading process, such as addition and/or removal of the sensors, to the apparatus.

Generally, the nature of banknotes are different from one another, in each country, the conventional banknote discrimination apparatus cannot flexibly correspond to such diversity of the banknotes from many countries. More specifically, in a certain country, a magnetic ingredient is contained in the ink used for printing it's banknotes, and hence the magnetic sensor is useful for discriminating the denominations of such banknotes. However, in another country, such a magnetic ingredient is not contained in the ink used for each banknote, thus there is no need for providing the magnetic sensor in the banknote discrimination apparatus. Therefore, such a conventional banknote discrimination apparatus should be designed separately, corresponding to various types or features of the banknotes of each country.

The present invention was made in light of the above circumstances, and it is therefore an object of this invention to provide a new banknote discrimination apparatus and a new banknote discrimination method, which can facilitate the addition and/or removal of various sensors to the apparatus, thereby eliminating the need that the design of the banknote discrimination apparatus should be done over again from the beginning, upon upgrading and/or downgrading the same apparatus.

The banknote discrimination apparatus according to the present invention is adapted for discriminating banknotes, and comprises: a body; a plurality of sensors, each detachably provided to the body and adapted for the detection of banknotes; and a control unit adapted for discriminating banknotes, based on detection information detected by each of the sensors; wherein the control unit is configured to discriminate the banknotes, by using the detection information detected by one of the plurality of sensors, which is newly attached to the body, in addition to the detection information detected by the sensor already attached to the body, if the one of the plurality of sensors is newly attached to the body.

In the banknote discrimination apparatus of this invention, it is preferred that the control unit includes a CPU (Central Processing Unit), a program memory provided to the CPU, and an FGPA (Field Programmable Gate Array) connected with the CPU, wherein the CPU is configured to rewrite a program of the FGPA, based on another program stored in the program memory, when the sensor is newly attached to or removed from the body.

In this case, it is preferred that the program is downloaded to the program memory from an external device when the sensor is newly attached to or removed from the body, wherein the CPU is configured to rewrite the program of the FGPA, based on the program downloaded to the program memory.

In the banknote discrimination apparatus of this invention, it is preferred that the body is configured such that a dummy member, having substantially the same shape as that of the one of the plurality of sensors, can be attached to a position from which the one of the sensors has been removed.

In the banknote discrimination apparatus of this invention, the sensors may include a magnetic sensor.

In the banknote discrimination apparatus of this invention, the sensors may include a fluorescent sensor.

In the banknote discrimination apparatus of this invention, the sensors may include a thread sensor.

In the banknote discrimination apparatus of this invention, the sensors may include an optical line sensor.

In this case, it is preferred that a pair of optical line sensors are provided, each of which is contained in each corresponding block. It is also preferred that the control unit is provided in one of the blocks. In addition, it is preferred that a sensor, adapted for discriminating the authenticity of a banknote, is additionally provided to one of the blocks, and this sensor is connected to the control unit.

Alternatively, the method according to the present invention uses the banknote discrimination apparatus, which is adapted for discriminating banknotes and includes a body; a plurality of sensors, each detachably provided to the body and adapted for detecting each banknote; and a control unit adapted for discriminating each banknote, based on detection information detected by each sensor, wherein the method comprises the steps of: attaching one of the plurality of sensors to the body; and discriminating a banknote, by using the detection information detected by the one of the plurality of sensors newly attached to the body, in addition to the detection information detected by any sensor already attached to the body.

In the banknote discrimination method of this invention, it is preferred that the banknote discrimination apparatus further includes a CPU (Central Processing Unit), a program memory provided to the CPU, and an FGPA (Field Programmable Gate Array) connected with the CPU, and the CPU is configured to rewrite a program of the FGPA, based on another program stored in the program memory, when the sensor is newly attached to or removed from the body.

In this case, it is preferred that the program is downloaded to the program memory from an external device when the sensor is newly attached to or removed from the body, wherein the CPU is configured to rewrite the program of the FGPA, based on the program downloaded to the program memory.

DETAILED DESCRIPTION OF THE INVENTION

Hereinafter, one exemplary embodiment of the present invention will be described with reference to the drawings. FIGS. 1 to 10 are provided for respectively showing the banknote discrimination apparatus related to this embodiment.

Figure 1:
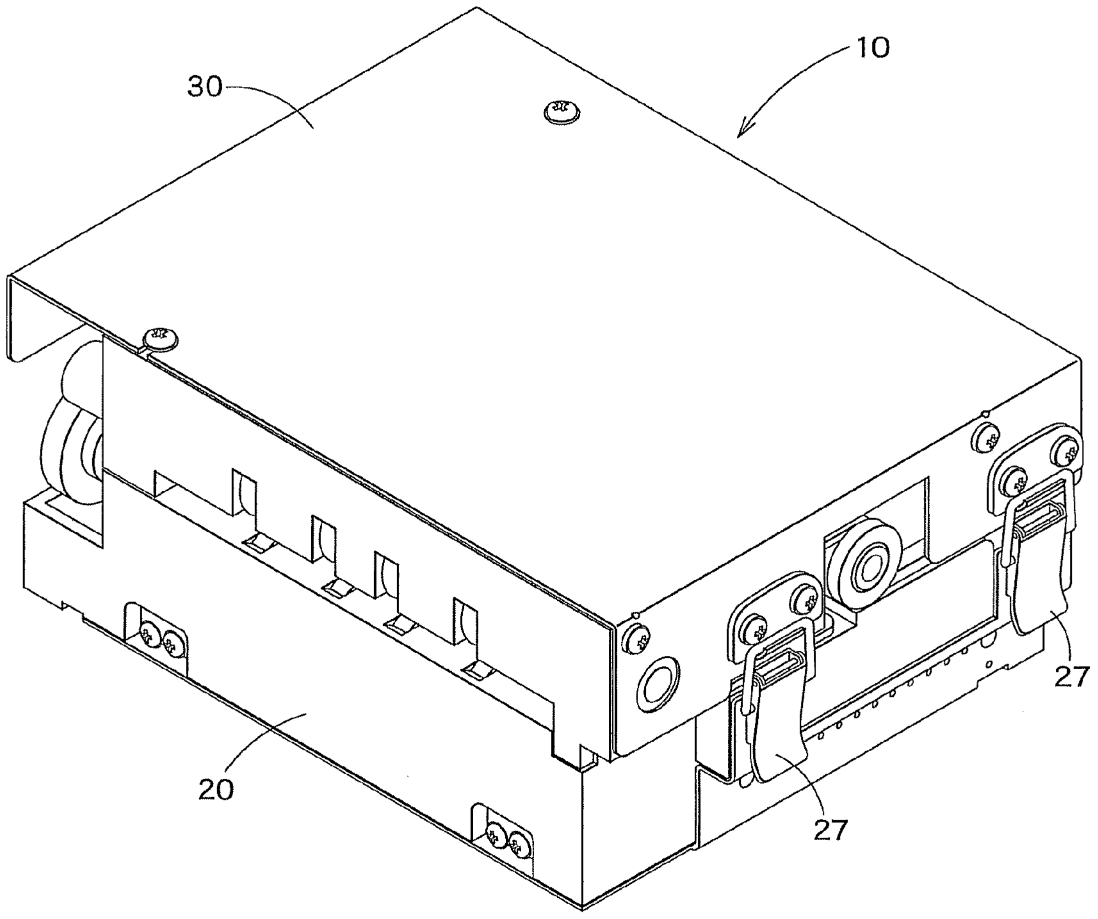
FIG. 1 is a perspective view showing exemplary construction of the banknote discrimination apparatus related to one embodiment of the present invention.
Figure 2:
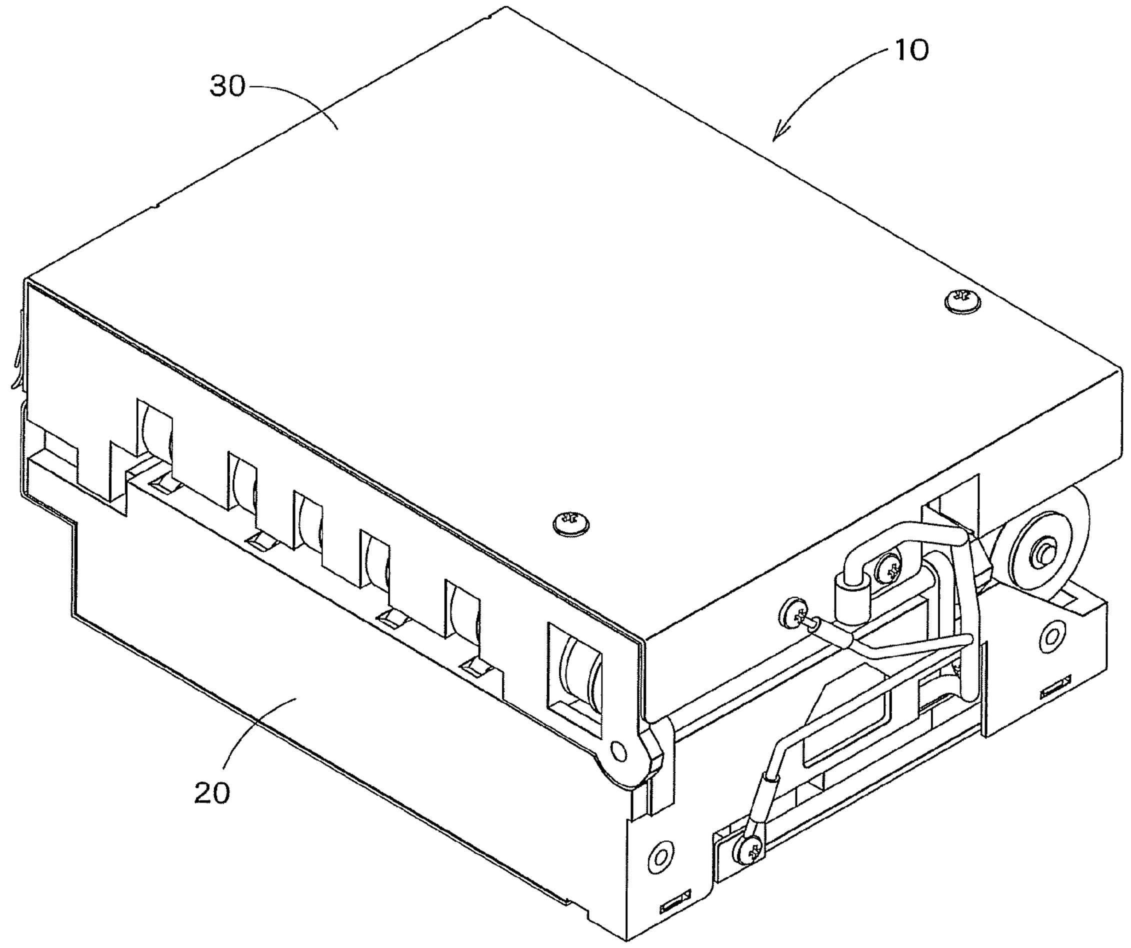
FIG. 2 is a perspective view showing the exemplary construction of the banknote discrimination apparatus shown in FIG. 1, when it is viewed from a rear side.

FIG. 1 is a perspective view showing exemplary construction of the banknote discrimination apparatus related to the embodiment of the present invention, and FIG. 2 is a perspective view showing the exemplary construction of the banknote discrimination apparatus shown in FIG. 1, when it is viewed from a rear side. As shown in FIGS. 1 and 2, a banknote discrimination apparatus 10 has a rectangular parallelepiped-like shape, and is composed of a pair of units, i.e., a lower unit 20 and an upper unit 30. The lower unit 20 and upper unit 30 are configured to be connected with each other by using connecting members 27, such as latch mechanisms or the like. Each banknote to be discriminated by the banknote discrimination apparatus 10 is first fed into an interspace provided between the lower unit 20 and the upper unit 30 and then transported in a preset direction through the interspace, so that discrimination for the banknote can be performed by various sensors, which will be described below, respectively.

Figure 3:
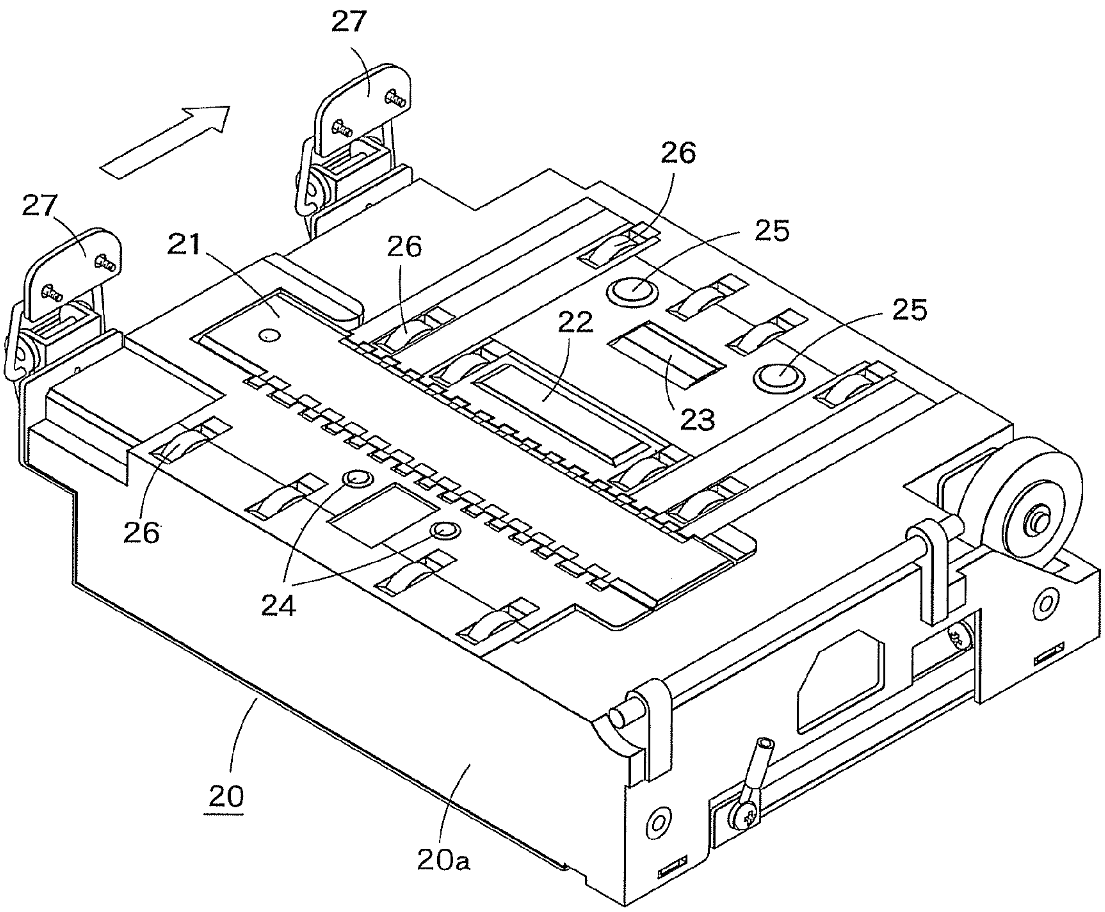
FIG. 3 is a perspective view showing construction of a lower unit of the banknote discrimination apparatus shown in FIG. 1.

First of all, the lower unit 20 will be described. FIG. 3 is a perspective view showing construction of the lower unit 20 of the banknote discrimination apparatus 10 shown in FIG. 1. On a top face shown in FIG. 3, each banknote is discriminated while being transported through the apparatus 10. Now, referring to FIG. 3, each component of the lower unit 20 will be discussed.

As shown in FIG. 3, a high resolution optical line sensor 21, a magnetic sensor 22 and a fluorescent sensor 23 are respectively provided to the top face of a rectangular parallelepiped-like body 20*a* of the lower unit 20. The high resolution optical line sensor 21, magnetic sensor 22 and fluorescent sensor 23 are detachably provided to the body 20*a*, respectively. It is noted that the high resolution optical line sensor 21 may be fixed to the body 20*a*. These sensors 21, 22, 23 will be detailed later. In addition, on the top face of the body 20*a* of the lower unit 20, timing sensors 24 are located on an upstream side, in a transport direction of banknotes (i.e., a direction designated by an arrow depicted in FIG. 3), relative to the respective sensors 21, 22, 23. Furthermore, on the top face of the body 20*a* of the lower unit 20, timing sensors 25 are located on a downstream side, in the transport direction of banknotes (i.e., the direction designated by the arrow depicted in FIG. 3), relative to the respective sensors 21, 22, 23. Additionally, transport rollers 26, each adapted for transporting banknotes in the direction designated by the arrow depicted in FIG. 3, are provided to the top face of the body 20*a* of the lower unit 20. At one edge portion of the body 20*a* of the lower unit 20, the connecting members 27, such as latch mechanisms, are attached. With such connecting members 27, a body 30*a* (described below) of the upper unit 30 can be connected with the body 20*a* of the lower unit 20.

Figure 4:
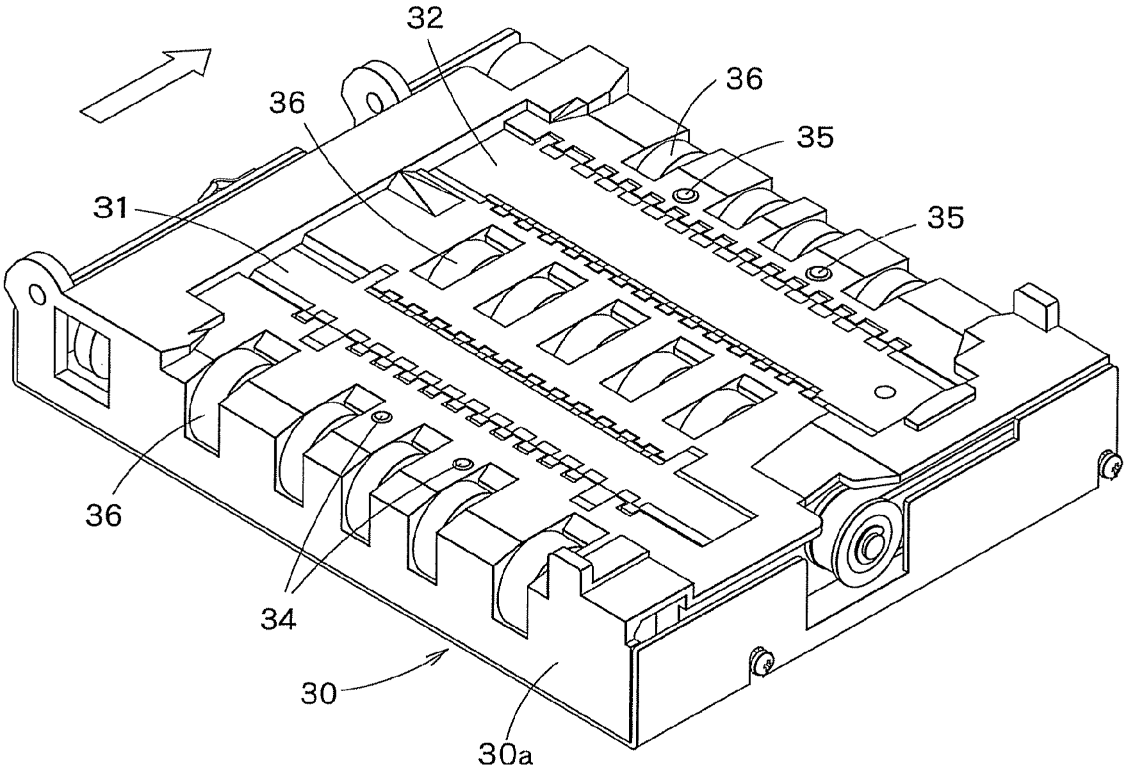
FIG. 4 is a perspective view showing construction of an upper unit of the banknote discrimination apparatus shown in FIG. 1, wherein an optical line sensor is attached to the upper unit.
Figure 5:
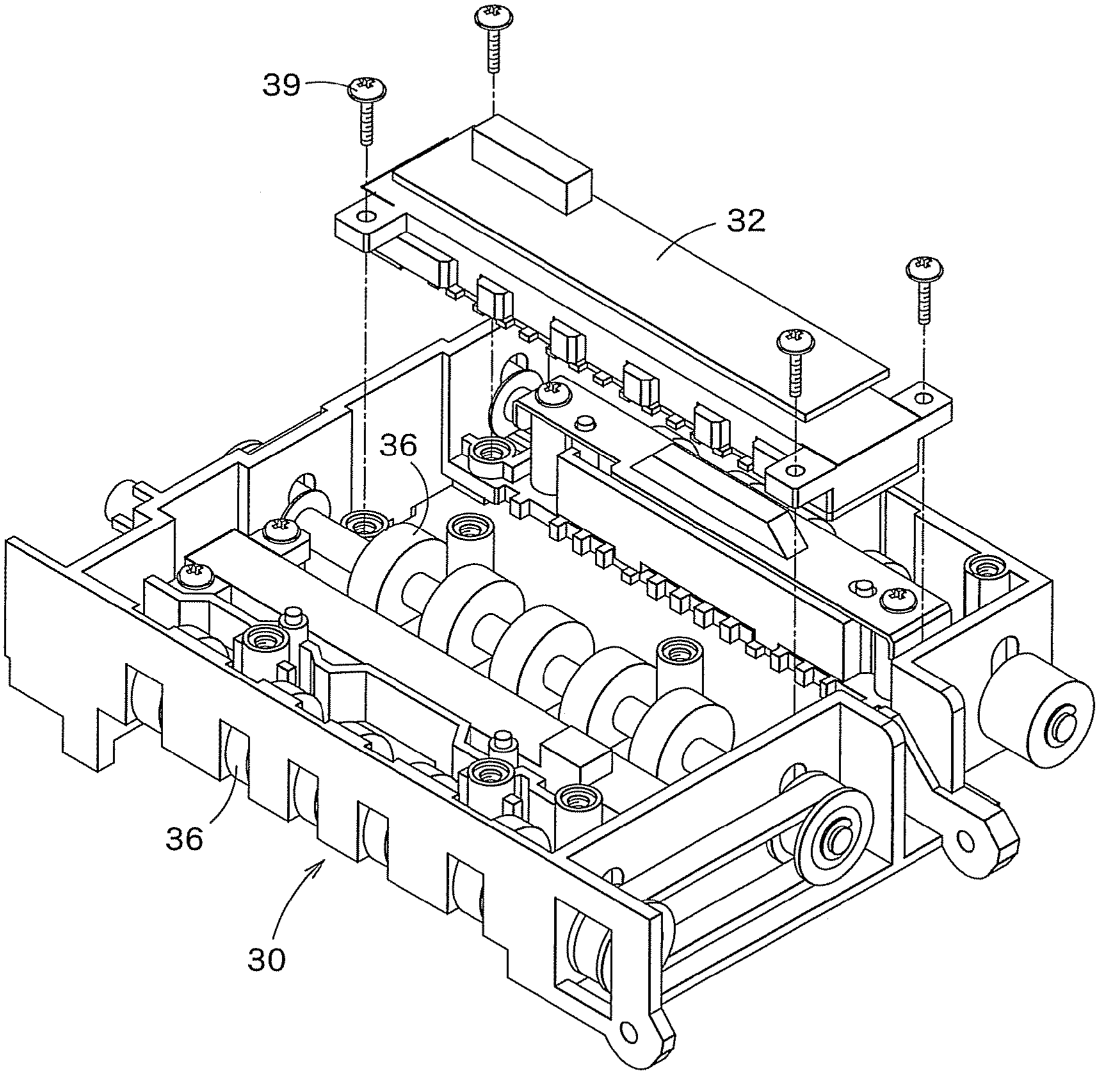
FIG. 5 is an exploded perspective view showing a state of the upper unit shown in FIG. 4, when viewed from a back side, upon the attachment of the optical line sensor to the upper unit.

Next, the upper unit 30 will be described. FIG. 4 is a perspective view showing construction of the upper unit 30 of the banknote discrimination apparatus 10 shown in FIG. 1, wherein an optical line sensor 32 is attached to the upper unit 30, and FIG. 5 is an exploded perspective view showing a state of the upper unit 30 shown in FIG. 4, when viewed from a bottom side, upon the attachment of the optical line sensor 32 to the upper unit 30. It is noted that the upper unit 30 shown in FIG. 4 is depicted as an upside-down one of the upper unit 30 of the banknote discrimination unit 10 shown in FIGS. 1 and 2. Namely, a banknote is discriminated while being transported along a top face shown in FIG. 4 (or bottom face in FIG. 5) of the upper unit 30. Now, each component of the upper unit 30 will be described in more detail with reference to FIGS. 4 and 5.

As shown in FIG. 4, a high resolution optical line sensor 31 and the optical line sensor 32 are respectively provided to the top face of a rectangular parallelepiped-like body 30*a* of the upper unit 30. The high resolution optical line sensor 31 and optical line sensor 32 are detachably provided to the body 30*a*, respectively. It is noted that the high resolution optical line sensor 31 may be fixed to the body 30*a*. These sensors 31 and 32 will be detailed later. In addition, on the top face of the body 30*a* of the upper unit 30, timing sensors 34 are located on an upstream side, in the transport direction of the banknotes (i.e., a direction designated by an arrow depicted in FIG. 4), relative to the respective sensors 31, 32. Furthermore, on the top face of the body 30*a* of the upper unit 30, timing sensors 35 are located on a downstream side, in the transport direction of the banknotes (i.e., the direction designated by the arrow depicted in FIG. 4), relative to the respective sensors 31, 32. Additionally, transport rollers 36, each adapted for transporting banknotes in the direction designated by the arrow depicted in FIG. 4, are provided to the top face of the body 30*a* of the upper unit 30.

Figure 6:
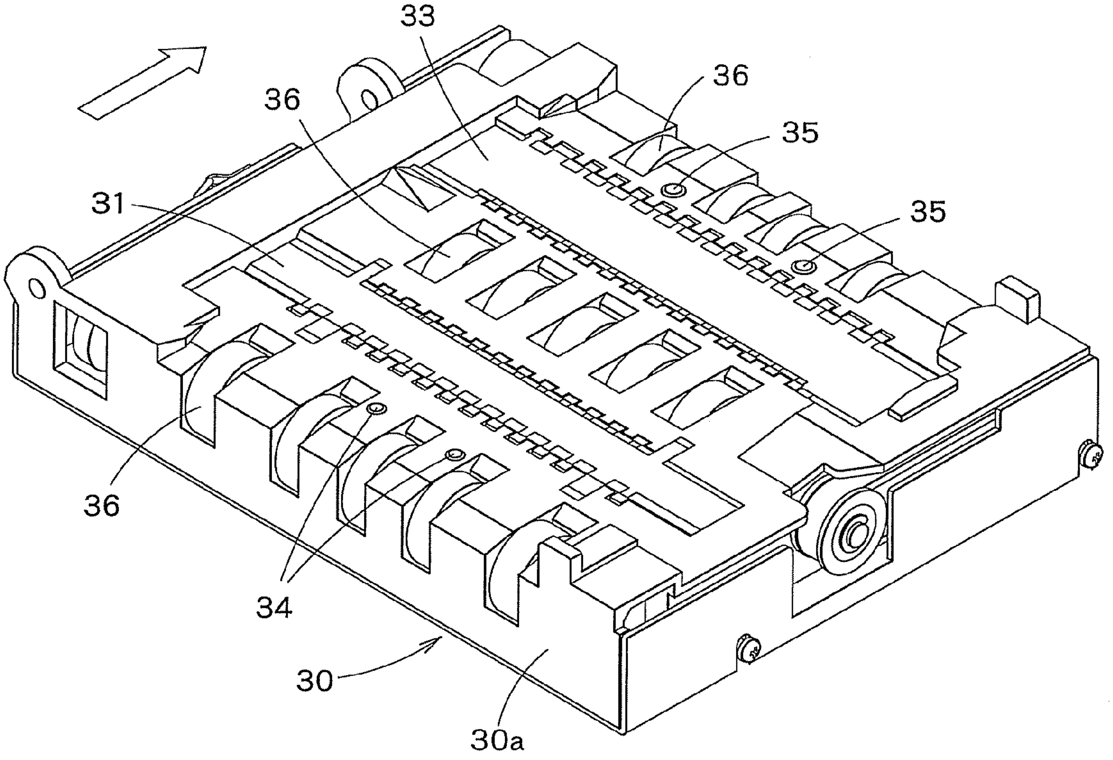
FIG. 6 is a perspective view showing the construction of the upper unit of the banknote discrimination apparatus shown in FIG. 1, wherein a dummy member is attached to the upper unit, in place of the optical line sensor.
Figure 7:
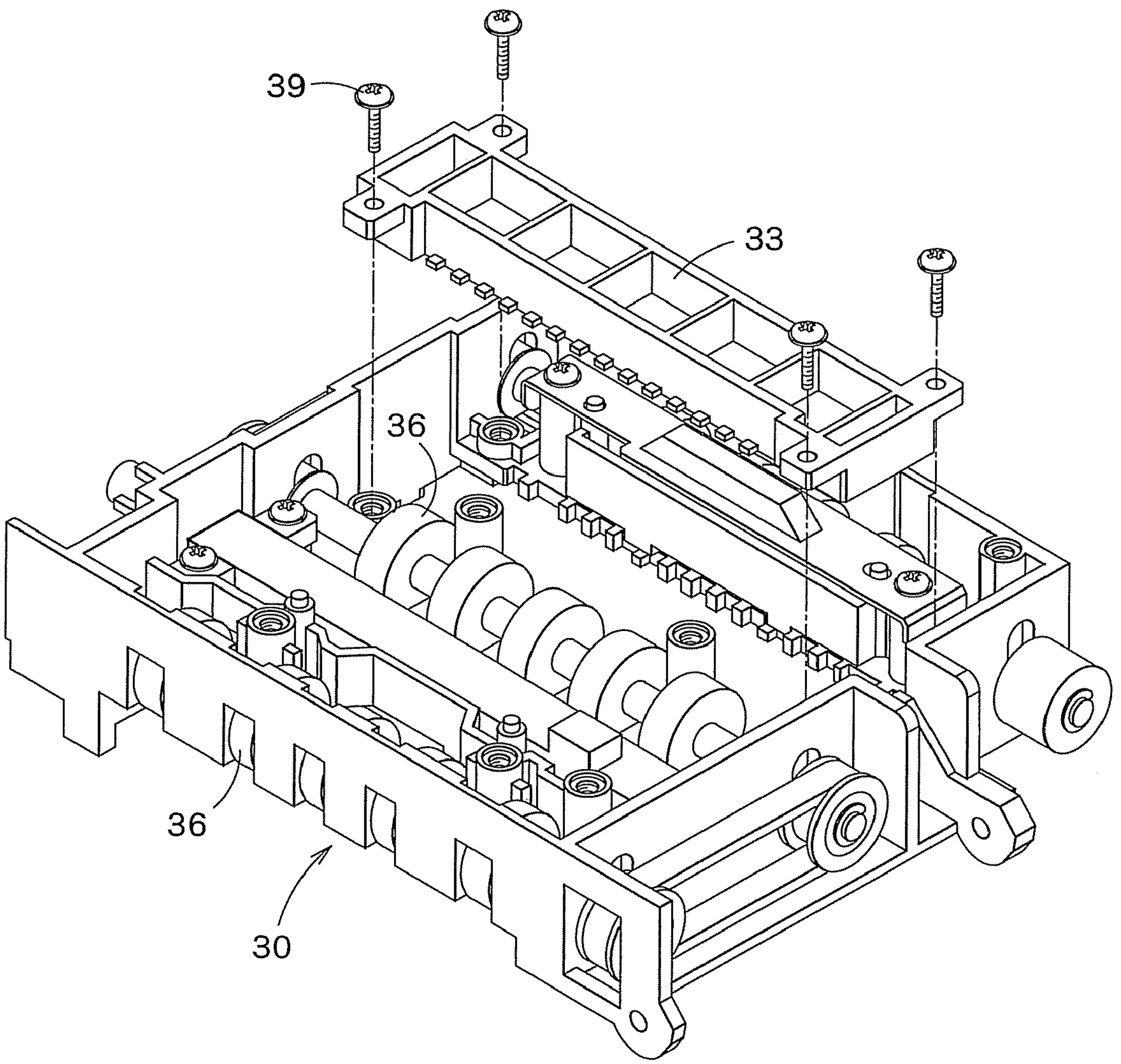
FIG. 7 is an exploded perspective view showing a state of the upper unit shown in FIG. 6, when viewed from the back side, upon the attachment of the dummy member to the upper unit.

The body 30*a* of the upper unit 30 is configured such that a dummy member 33, which is not a sensor, can be attached to the position, at which the optical sensor 32 was attached, after removal of the optical line sensor 32 from the body 30*a*. FIG. 6 is a perspective view showing the construction of the upper unit 30 of the banknote discrimination apparatus shown in FIG. 1, wherein the dummy member 33 is attached to the upper unit 30, in place of the optical line sensor 32. FIG. 7 is an exploded perspective view showing a state of the upper unit 30 shown in FIG. 6, when viewed from the back side, upon the attachment of the dummy member 33 to the upper unit 30.

As shown in FIGS. 4 and 6, the optical line sensor 32 and the dummy member 33 have substantially the same construction. However, the dummy member 33 is merely composed of, for example, a plastic material or the like, as such it cannot be used, of course, for detection of the banknotes. The surface of the dummy member 33 is substantially flush with the surface of the body 30*a*, so that each banknote that is transported on the surface of the body 30*a* by the transport rollers 36 can be transported smoothly on the surface of the dummy member 33.

As shown in FIGS. 5 and 7, the optical line sensor 32 or the dummy member 33 can be attached to the body 30*a* of the upper unit 30, from the rear side, respectively. Each of the optical line sensor 32 and dummy member 33 can be attached to the body 30*a* by using fastening members 39, such as attachment screws. It is appreciated that the optical line sensor 32 and dummy member 33 can be attached to the body 30*a* via the same fastening members 39, respectively. Thus, the dummy member 33 can be readily attached to the body 30*a*, after the optical line sensor 32 is removed therefrom. Similarly, the optical line sensor 32 can be readily attached to the body 30*a*, after the dummy member 33 is removed therefrom.

Figure 8:
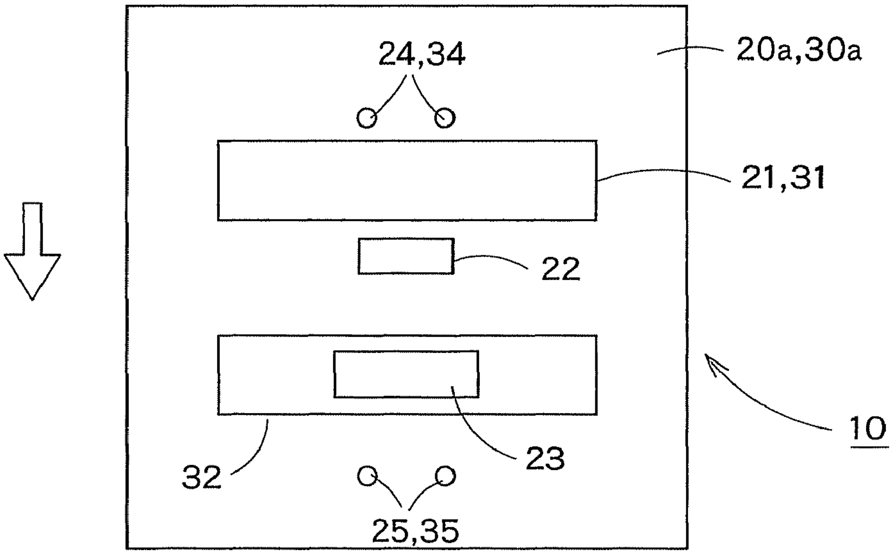
FIG. 8 is a plan view schematically showing arrangement of various sensors in the banknote discrimination apparatus shown in FIG. 1.
Figure 9:
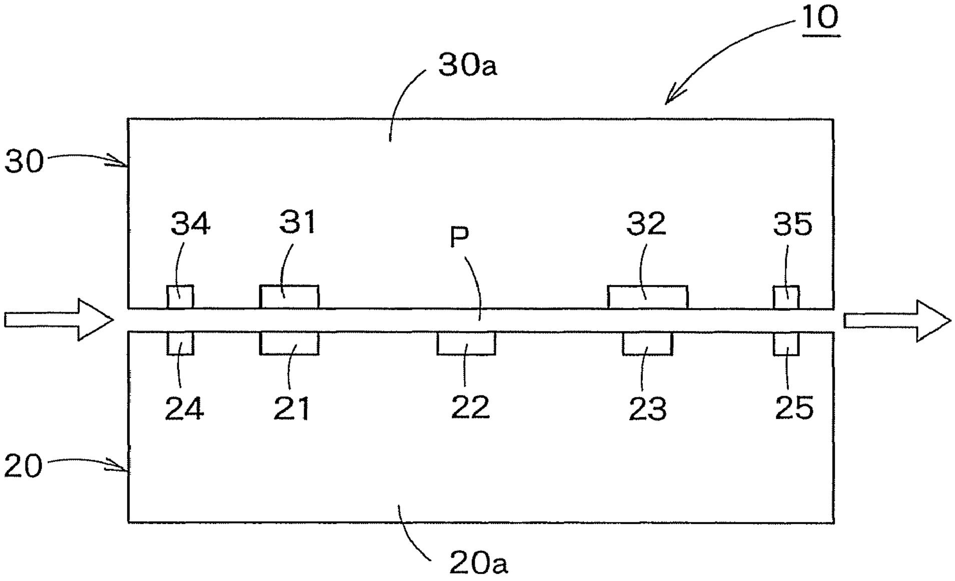
FIG. 9 is a side view schematically showing the arrangement of the various sensors in the banknote discrimination apparatus shown in FIG. 1.

Referring now to FIGS. 8 and 9, arrangement and construction of each sensor 21 to 25 provided in the lower unit 20 as well as those of each sensor 31, 32, 34, 35 provided in the upper unit 30 will be described, respectively. FIG. 8 is a plan view schematically showing arrangement of the respective sensors in the banknote discrimination apparatus 10 shown in FIG. 1. FIG. 9 is a side view schematically showing the arrangement of the respective sensors in the banknote discrimination apparatus 10 shown in FIG. 1.

As shown in FIG. 9, a narrow path P, through which each banknote can be transported, is provided in the interspace constructed between the lower unit 20 and the upper unit 30. Along the path P, each pair of timing sensors 24, 34, a pair of high resolution optical line sensors 21, 31, the magnetic sensor 22, the optical line sensor 32, the fluorescent sensor 23 and each pair of timing sensors 25, 35 are disposed, respectively, in succession, from the upstream side, in the transport direction of the banknotes.

Each pair of timing sensors 24, 34, as shown in FIG. 9, are positioned such that they are opposed to one another across the path P for each banknote. Of these timing sensors 24, 34, one of the sensors (e.g., the timing sensors 24) comprises an emission part, while the other of the sensors (e.g., the timing sensors 34) comprises a light receiving part. Thus, light emitted from the one of the sensors can be received by the other of the sensors. In this case, when a banknote reaches each pair of timing sensors 24, 34, the light emitted from the one of the sensors is blocked by the banknote, and hence it cannot reach the other of the sensors. In this way, arrival of the banknote at the banknote discrimination apparatus 10 can be detected.

The pair of high resolution optical line sensors 21, 31, as shown in FIG. 9, are positioned such that they are opposed to one another across the banknote path P. Of these high resolution optical line sensors 21, 31, one resolution optical line sensor (e.g., the high resolution optical line sensor 21) is provided with an infrared-light LED array adapted for emitting infrared light, while the other high resolution optical sensor (e.g., the high resolution optical line sensor 31) is provided with, for example, a visible-light LED array adapted for emitting visible light, such as red light, and a light receiving element adapted for receiving light. In this case, the infrared light emitted from the infrared-light LED array provided to the one high resolution optical line sensor will be received by the light receiving element provided to the other optical line sensor, when being transmitted through the banknote present in the path P. Consequently, infrared-light image data of the banknote can be obtained, based on the infrared light received by the light receiving element, when being transmitted through the banknote. Meanwhile, the visible light emitted from the visible-light LED array of the other optical line sensor will be received by the light receiving element of this optical line sensor, after reflected by the banknote present in the path P. As such, visible-light image data of the banknote can be obtained, based on the visible light received by the light receiving element, when being reflected by the banknote. With such infrared-light image data and visible-light image data obtained by using the pair of high resolution optical line sensors 21, 31, discrimination of the denomination, authenticity, fitness, new or old version, or the like for each banknote as well as reading of each banknote serial number (i.e., a serial number assigned to each banknote, upon printing, such that the serial number is made differently relative to each other for all of the printed banknotes) can be performed.

Similar to the dummy member 33 for the optical line sensor 32, after the high resolution optical line sensors 21, 31 are respectively removed from the bodies 20*a*, 30*a*, alternate dummy members, each having substantially the same shape of each high resolution optical line sensor 21, 31 and made of, for example, a plastic material, can be attached to positions, from which the high resolution optical line sensors 21, 31 for the bodies 20*a*, 30*a* were removed, respectively.

The magnetic sensor 22 has a magnetic head, such that a quantity of magnetic of magnetic ink used for each banknote can be detected by the magnetic sensor 22, in the case in which the banknote using such ink containing a magnetic ingredient is transported through the path P. Based on the so-detected quantity of magnetism of the magnetic ink used for the banknote, the authenticity and the like factor of the banknote can be discriminated. As described above, the magnetic sensor 22 is detachably fixed to the body 20*a* of the lower unit 20.

The fluorescent sensor 23 is configured to detect an amount of a fluorescent ingredient of the ink used for each banknote, when the banknote using the ink containing such a fluorescent ingredient is transported through the path P. With such a fluorescent sensor 23, the authenticity and the like factor can be discriminated, based on the so-obtained amount of the fluorescent ingredient contained in the ink used for the banknote.

As discussed above, the fluorescent sensor 23 is detachably mounted to the body 20*a* of the lower unit 20. Again, similar to the dummy member 33 for the optical line sensor 32, a suitable dummy member, having substantially the same shape of the fluorescent sensor 23 and made of, for example, a plastic material, can be attached to a position from which the fluorescent sensor 23 for the body 20*a* was removed, after the removal of the fluorescent sensor 23 from the body 20*a*.

The optical line sensor 32, as shown in FIG. 9, is provided on an opposite side to the fluorescent sensor 23 across the path P. The optical line sensor 32 includes a red-light LED array adapted for emitting red light and a light receiving element for receiving light. In this case, the red light emitted from the red-light LED array of the optical line sensor 32 will be received by the light receiving element of the same optical line sensor, when being reflected by the banknote present in the path P. In this way, red-light image data can be obtained, based on the red light received by the light receiving element, after reflected by the banknote. Namely, in such an optical line sensor 32, the denomination, authenticity, fitness, new or old version, or the like of each banknote can be discriminated, based on the so-obtained red-light image data.

As described above, after the optical line sensor 32 is removed from the body 30*a*, the dummy member 33, having substantially the same shape of the optical line sensor 32 and composed of, for example, a suitable plastic material, can be attached to the position, from which the optical line sensors 32 was removed from the body 30*a*.

Each pair of left and right timing sensors 25, 35, as shown in FIG. 9, are opposed to each other, across the banknote path P, on a downstream side of the optical line sensor 32 and fluorescent sensor 23, respectively. One of these left and right timing sensors 25, 35 (e.g., the timing sensors 25) are composed of an emission part, while the other of the sensors (e.g., the timing sensors 35) are composed of a light receiving part, so that the light emitted from the one of the sensors can be received by the other of the sensors, respectively. In this case, when one banknote reaches each pair of timing sensors 25, 35, the light emitted from the one of the sensors is blocked by the banknote, as such it cannot reach the other of the sensors. Thereafter, when the banknote is ejected from the banknote discrimination apparatus 10, the light emitted from the one of the sensors will in turn reach the other of the sensors. As such, ejection of the banknote from the banknote discrimination apparatus 10 is detected.

Although not shown in FIGS. 1 to 9, additional sensors, such as a thickness sensor 41 adapted for detecting thickness of each banknote, a thread sensor 42 adapted for detecting a metal thread incorporated in the banknote for the purpose of preventing forgery, and the like, may be provided to the banknote discrimination apparatus 10. Such additionally provided thickness sensor 41 and thread sensor 42 are detachably provided to the banknote discrimination apparatus 10. As such, similar to the dummy member 33 for the optical line sensor 32, after such sensors are removed from the banknote discrimination apparatus 10, alternate dummy members, each having substantially the same shape of these sensors and made of, for example, a plastic material, can be attached to positions, from which these sensors for the banknote discrimination apparatus 10 were removed, respectively.

Figure 10:
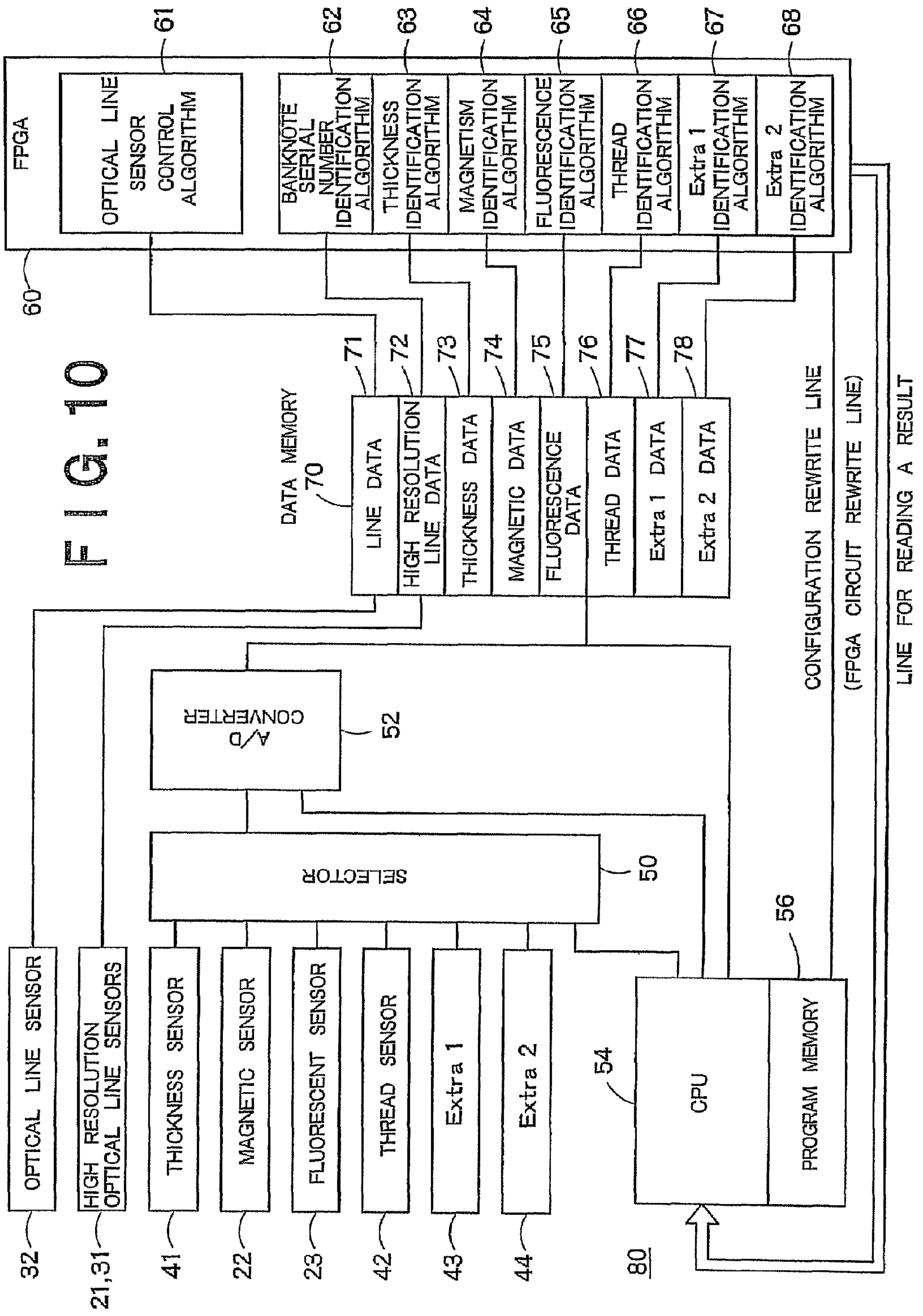
FIG. 10 is a circuit block diagram of the banknote discrimination apparatus according to the present invention.

Now, referring to FIG. 10, a circuit block diagram of the banknote discrimination apparatus according to the present invention will be described. As shown in FIG. 10, a circuit 80 of the banknote discrimination apparatus 10 includes a functional-block-based construction, for example. In addition to the sensors provided to the banknote discrimination apparatus 10 shown in FIGS. 1 through 9, FIG. 10 illustrates one example in which the thickness sensor 41 and thread sensor 42 are further provided.

Specifically, as shown in FIG. 10, the magnetic sensor 22, fluorescent sensor 23, thickness sensor 41 and thread sensor 42 are configured to be connected with a selector 50, respectively. Besides, for further attachment of additional sensors to the banknote discrimination apparatus 10, reserve ports 43, 44 that can permit connection of such sensors to the selector 50 are provided, respectively. A CPU (Central Processing Unit) 54 is also connected with the selector 50. Further, an A/D converter 52 is connected with the selector 50. The A/D converter 52 in turn is connected to the CPU 54. A program memory 56 is also provided to the CPU 54.

The pair of high resolution optical line sensors 21, 31 and optical line sensor 32 incorporate read control circuits and AD converters, respectively. Thus, the pair of high resolution optical line sensors 21, 31 and optical line sensor 32 can be connected with a data memory 70, respectively. To the data memory 70, the A/D converter 52 and CPU 54 are connected, respectively. The data memory 70 is configured to receive and store therein line data 71 corresponding to the optical line sensor 32, high resolution line data 72 corresponding to the pair of high resolution optical line sensors 21, 31, thickness data 73 corresponding to the thickness sensor 41, magnetic data 74 corresponding to the magnetic sensor 22, fluorescence data 75 corresponding to the fluorescent sensor 23, thread data 76 corresponding to the thread sensor 42, and Extra 1 data and Extra 2 data respectively corresponding to the additional sensors provided via the additional ports 43, 44 (i.e., Extra 1, Extra 2).

As shown in FIG. 10, an FPGA (Field Programmable Gate Array) 60 is connected with the data memory 70. As used herein, the FPGA 60 means an LSI (Large Scale Integrated Circuit), in which a user can directly program his or her original logic circuit. More specifically, the FPGA 60 is configured to convert various data of each banknote, sent to the data memory 70, into information about the features of the banknote. In the FPGA 60, an optical line sensor control algorithm 61 corresponding to the line data 71 of the data memory 70, a banknote serial number identification algorithm 62 corresponding to the high resolution line data 72 of the data memory 70, a thickness identification algorithm 63 corresponding to the thickness data 73 of the data memory 70, a magnetism identification algorithm 64 corresponding to the magnetic data 74 of the data memory 70, fluorescence identification algorithm 65 corresponding to the fluorescent data 75 of the data memory 70, a thread identification algorithm 66 corresponding to the thread data 76 of the data memory 70, an Extra 1 identification algorithm 67 corresponding to the Extra 1 data 77 of the data memory 70, and an Extra 2 identification algorithm 68 corresponding to the Extra data 78 are stored, respectively.

The CPU 54 is configured to receive a result of discrimination of the denomination, authenticity, fitness, new or old version, or the like of each banknote and/or result of identification of each banknote serial number, which are respectively based on the information about the features of the banknote, sent from the FPGA 60 (see "Line for reading a result" shown in FIG. 10). In this case, as shown in FIG. 10, a configuration rewrite line (or FPGA circuit rewrite line) is provided between the CPU 54 and the FPGA 60, so that the CPU 54 can rewrite a program provided to the FPGA 60 via the configuration rewrite line.

Next, operation of the banknote discrimination apparatus 10 constructed as described above will be discussed.

First of all, the banknote fed into the banknote discrimination apparatus 10 is transported, in the direction designated by each arrow depicted in FIGS. 3, 4, 6, 8 and 9, through the path P formed between the lower unit 20 and the upper unit 30. During this period of time, the banknote is first detected by the timing sensors 24, 34, thereby obtaining the information that the banknote has arrived in the banknote discrimination apparatus 10. Subsequently, the banknote is detected by the pair of upper and lower high resolution optical line sensors 21, 31, as such obtaining the infrared-light image data and/or visible-light image data for discriminating the denomination, authenticity, fitness, new or old version, or the like of each banknote and/or reading the banknote serial number. Then, such data will be sent to the data memory 70.

Thereafter, the banknote transported through the path P is detected by the magnetic sensor 22, so as to obtain the magnetic data for discriminating the authenticity or the like of the banknote. Such data will be sent to the data memory 70, via the selector 50 and A/D converter 52.

Then, the banknote is detected by the fluorescent sensor 23, so as to obtain fluorescent data to authenticate the banknote. Thereafter, the data will be sent to the data memory 70, via the selector 50 and A/D converter 52.

Furthermore, the banknote is detected by the optical line sensor 32, so that the red-light image data for discriminating the denomination, authenticity, fitness, new or old version, or the like of each banknote can be obtained. Such data will also be sent to the data memory 70, via the selector 50 and A/D converter 52.

Additionally, in the case in which the thickness sensor 41 and/or thread sensor 42 as well as further additional sensors respectively corresponding to the additional ports 43, 44 are provided to the banknote discrimination apparatus 10, the banknote transported through the path P is further detected by such sensors, so as to obtain data, such as the thickness data, thread data and the like. Then, such data will be sent to the data memory 70, via the selector 50 and A/D converter 52.

In this way, the CPU 54 will receive the result of discrimination of the denomination, authenticity, fitness, new or old version, or the like of each banknote and/or result of identification of each banknote serial number, by using the data detected by each sensor 21, 22, 23, 31, 32, 41, 42 or the like, due to each IP 61 to 68 provided in FPGA 60 based on each data 71 to 78 sent to the data memory 70.

Finally, the ejection of the banknote from the banknote discrimination apparatus 10 is detected by the timing sensors 25, 35.

Next, operation for replacing the dummy member 33 with the optical line sensor 32 will be described. In this case, the dummy member 33 is provided, in advance, to the banknote discrimination apparatus 10, as shown in FIG. 6, in place of the optical line sensor 32.

First, the dummy member 33 attached to the body 30*a* of the upper unit 30 of the banknote discrimination apparatus 10, as shown in FIG. 6, is removed from the body 30*a* by disengaging the respective fastening members 39, as shown in FIG. 7.

Thereafter, as shown in FIG. 5, the optical line sensor 32 is attached, via the same fastening members 39, to the positions of the body 30*a*, at which the dummy member 33 was attached. In this way, the optical line sensor 32 can be provided to the upper unit 30, as shown in FIG. 4.

As a result, in the circuit 80 as shown in FIG. 10, the optical line sensor 32 is connected with the data memory 70, and the CPU 54 rewrites the program provided to the FPGA 60 via the configuration rewrite line. The so-rewritten program may be stored in advance in the program memory 56 or otherwise may be obtained by downloading the program to the program memory 56 from an external device.

With respect to such a rewriting operation for the program of FPGA 60 as described above, one example is disclosed in JP2004-21867A, the entire contents of which are hereby incorporated herein by reference.

As described above, the banknote discrimination apparatus 10 and banknote discrimination method of this embodiment comprises: the bodies 20*a*, 30*a*; the plurality of sensors 21, 22, 23, 31, 32, each detachably provided to the bodies 20*a*, 30*a* and adapted for detecting each banknote; and a control unit adapted for discriminating the banknote, based on the detection information detected by each sensor 21, 22, 23, 31, 32, wherein the control unit is configured to discriminate the banknote, by using the detection information detected by one of the plurality of sensors 21, 22, 23, 31, 32, which is newly attached to one of the bodies 20*a*, 30*a*, in addition to the detection information detected by the sensors already attached to the bodies 20*a*, 30*a*, if the one of the plurality of sensors 21, 22, 23, 31, 32 is newly attached to the one of the bodies 20*a*, 30*a*. Therefore, addition and/or removal of various sensors relative to the banknote discrimination apparatus 10 can be facilitated, thereby eliminating the need that the design for the banknote discrimination apparatus 10 must be done over again from the beginning, upon upgrading and/or downgrading the same apparatus 10.

Specifically, a user, who purchased such a banknote discrimination apparatus 10 that includes the pair of high resolution optical line sensors 21, 31 and magnetic sensor 22 as the basic components for the same apparatus, can further make an order for additional sensors, for example, corresponding to the case in which new banknotes are issued. For instance, in the case in which such banknotes that will generate fluorescence when exposed to ultraviolet light are newly issued, or in the case in which one wants to detect the banknote copied to a white-colored copy paper, the fluorescent sensor 23 can be added to the banknote discrimination apparatus 10.

In addition, as shown in FIG. 10, the banknote discrimination apparatus 10 includes IP-based units (or functional-block-based units), wherein the CPU 54, program memory 56 provided to the CPU 54 and FPGA 60 connected with the CPU 54 are respectively provided to the banknote discrimination apparatus 10. Thus, when some sensor or sensors are attached to or removed from the bodies 20*a*, 30*a*, the CPU 54 will rewrite the program of the FPGA 60, based on the program stored in the program memory 56.

Additionally, when some sensor or sensors are attached to or detached from the bodies 20*a*, 30*a*, a new program will be downloaded from an external device to the program memory 56, thus the CPU 54 will rewrite the program of the FPGA 60, based on the program downloaded to the program memory 56.

It should be appreciated that the banknote discrimination apparatus 10 and banknote discrimination method according to the present invention are not limited to an aspect discussed above, and that various modifications can be added thereto without departing from the scope of this invention.

Hereinafter, an arrangement relationship between each sensor provided in the banknote discrimination apparatus 10 and the circuit 80 including the IP-based construction (or functional-block-based construction) as shown in FIG. 10 will be described with reference to FIG. 11. For clarity, as one example, the banknote discrimination apparatus 10 that is composed of only the pair of high resolution optical line sensors 21, 31 will be described.

Figure 11:
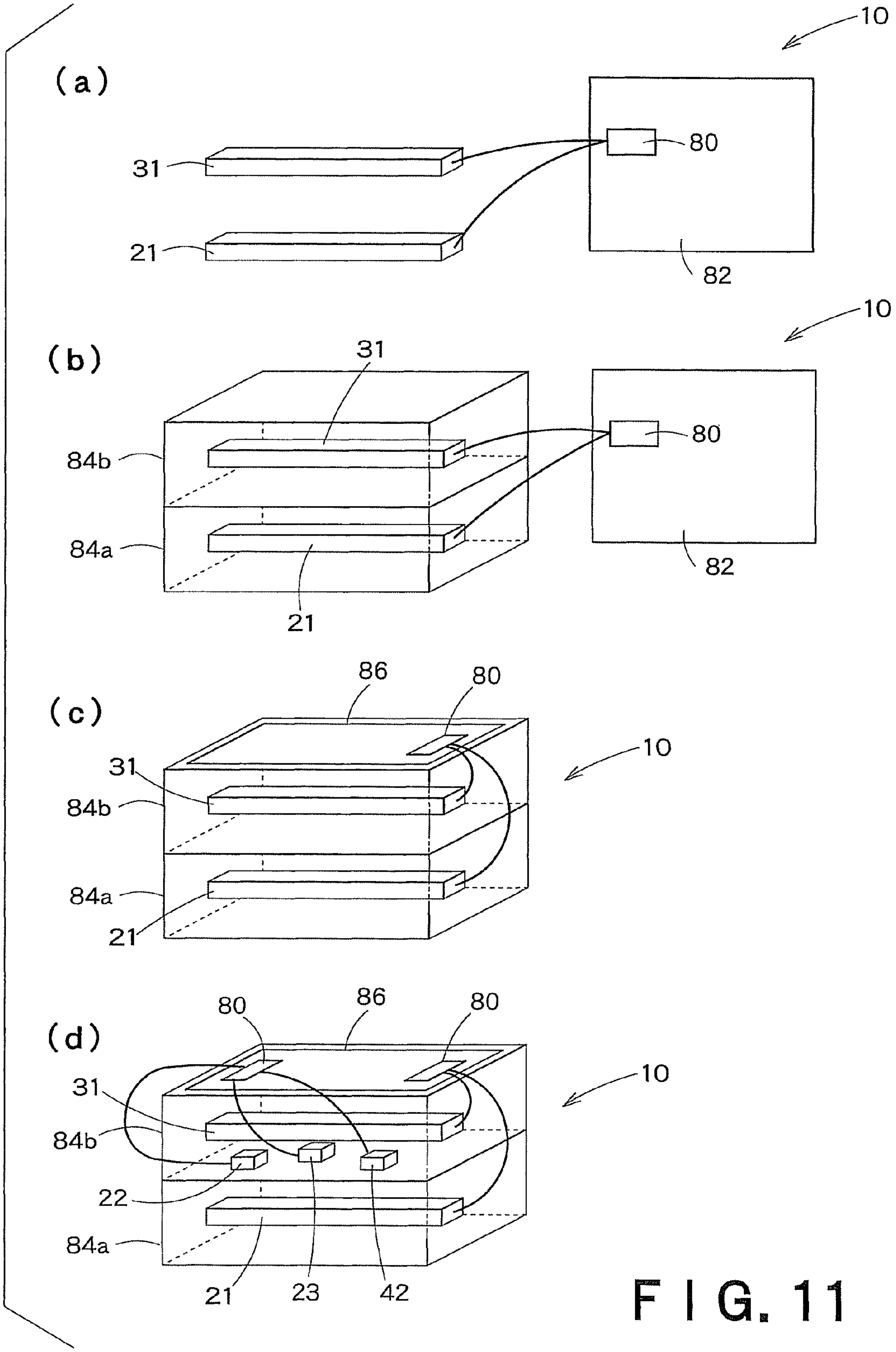
FIG. 11 is an illustration showing the construction of the banknote discrimination apparatus according to the present invention.

As shown in FIG. 11(*a*), the pair of high resolution optical line sensors 21, 31, each adapted for reading an image of the whole body of the banknote, are arranged over the transport path for each banknote, so as to capture the infrared-light image data and visible-light image data on one side of the banknote, respectively. In this case, the control for each of the high resolution optical line sensors 21, 31 and capture of the image data are performed by the CPU 54 of the circuit 80, while execution of an algorithm concerning the identification is performed by the FPGA 60. In this example as shown in FIG. 11(*a*), the circuit 80 is provided on a CPU board 82.

FIG. 11(*b*) shows an identification sensor block, which is composed of blocks 84*a*, 84*b* respectively storing therein the pair of high resolution optical line sensors 21, 31. The basic construction of this sensor block is generally the same as that shown in FIG. 11(*a*). However, since the banknote discrimination apparatus 10 shown in FIG. 11(*b*) is constructed of functional blocks, it is superior in applicability and practicability for design. Namely, in such a case of the apparatus 10 as shown in FIG. 11(*a*), attachment positions for the respective high resolution line sensors 21, 31 must be designed again each time the model of the apparatus is changed. However, in the case of the apparatus 10 as shown in FIG. 11(*b*), since the optical line sensors 21, 31 are respectively stored in the blocks 84*a*, 84*b*, only the connection of the entire path should be considered for the design. This can significantly facilitate the design.

FIG. 11(*c*) shows another example of the banknote discrimination apparatus 10, in which a control board 86 containing the entire body of the circuit 80 is mounted on one of the block 84*a*, 84*b* (e.g., the block 84*b*) shown in FIG. 11(*b*). Specifically, the CPU 54 is mounted on the control board 86, such that the pair of high resolution optical line sensors 21, 31 and the like components are controlled by the CPU 54. Additionally, the algorithm concerning the identification is performed by the FPGA 60 mounted on the control board 86.

FIG. 11(*d*) shows still another example, in which the magnetic sensor 22, fluorescent sensor 23 and thread sensor 42 are added to the banknote discrimination apparatus 10 shown in FIG. 11(*c*). In the banknote discrimination apparatus 10 as shown in FIG. 11(*d*), algorithm is basically applied in the FPGA 60 in order to process the image data obtained by the pair of high resolution optical line sensors 21, 31. Furthermore, since there are various different banknotes for each country, the banknote discrimination apparatus 10 must correspond to such differences one by one. Namely, in view of a level of security in the printing for such banknotes, it is necessary to add the sensors, for example, the magnetic sensor 22, fluorescent sensor 23 and thread sensor 42, each for discriminating the authenticity or the like factor of each banknote, to the banknote discrimination apparatus 10. However, with the construction as shown in FIG. 11(*d*), such correspondence to the various kinds of banknotes can be facilitated.

In the case of the banknote discrimination apparatus 10 as shown in FIGS. 11(*a*) to 11(*d*), common use of the identification algorithm for the optical system is attempted. Thus, for example, the banknote discrimination apparatus 10 of the type as shown in FIG. 11(*c*) is prepared and utilized for development of these apparatuses. In this way, the so-prepared and finalized one can be directly utilized for constructing the banknote discrimination apparatus 10 of other types as shown in FIGS. 11(*a*), 11(*b*) and 11(*d*). Namely, the identification algorithm developed for and provided in the apparatus 10 as shown in FIG. 11(*c*) can also be applied to other apparatuses 10 as shown in FIGS. 11(*a*), 11(*b*) and 11(*d*), directly or in a form added with proper modification for each unit.

Additionally, in the banknote discrimination apparatuses 10 as shown in FIGS. 11(*a*) to 11(*d*), a function shown in FIG. 11(*a*) is a basic configuration of the respective types of banknote discrimination apparatus shown in FIGS. 11(*b*) to 11(*d*). Therefore, even in such different construction as shown in FIGS. 11(*b*) to 11(*d*), the function and/or operation of the pair of upper and lower high resolution optical line sensors 21, 31 shown in FIG. 11(*a*) can be commonly used. Thus, development assets can also be commonly utilized in this regard. This can facilitate production of both high-end and low-end machines, each having such a common basic function.

While the entire function of the banknote discrimination apparatus 10 varied over a wider range from a lower level to a higher level can be realized, the functional level of each sensor itself can also be selected over a wider range of from a lower one to a higher one. Specifically, the resolution of the pair of high resolution optical line sensors 21, 31 can be selected over a relatively wide range of from a lower level (e.g., 16.9 dpi) to a higher level (e.g., 400 to 800 dpi). Alternatively, the resolution can also be adjusted, based on optical information obtained from a photodiode array (with a pitch of from 1.5 mm to 3 mm).

As another construction related to the banknote discrimination apparatus 10 according to the present invention, a paper-sheet discrimination apparatus disclosed in JP2792703B, the entire contents of which are hereby incorporated herein by reference, can be mentioned.

Now, the paper-sheet discrimination apparatus disclosed in JP2792703B will be described. This paper-sheet discrimination apparatus is of a type for discriminating paper sheets, such as banknotes, by using a pattern-matching method. More specifically, the paper-sheet discrimination apparatus of this type is configured to discriminate each paper sheet in response to a driving pulse, while transporting it on a transport path.

The paper-sheet discrimination apparatus includes a detection sensor for detecting a pattern of each paper sheet; a memory unit adapted for storing therein a value concerning each output signal of the detection sensor, as detection data, in response to the driving pulse; an average-value calculation unit adapted for calculating the average value of the data stored in the memory unit; and a grayscale-value calculation unit adapted for calculating a difference between the average value calculated by the average-value calculation unit and the aforementioned data, as a grayscale value.

The paper-sheet discrimination apparatus further includes a normalization unit adapted for obtaining the sum total of each grayscale value calculated by the grayscale-value calculation unit and then dividing each grayscale value by the sum total, thereby obtaining an arrangement pattern of grayscale intensity in each portion detected by the detection sensor; a comparison unit adapted for comparing the arrangement pattern of the grayscale intensity with a preset reference pattern; and a discrimination unit adapted for discriminating each paper sheet, based on a result of comparison obtained by the comparison unit.

According to the paper-sheet discrimination apparatus as described above, the entire body of a magnetic pattern and/or optical pattern of each paper sheet is registered, in advance, as a reference pattern for each denomination, and a detection pattern prepared after processing each read data is then compared with the reference pattern, so that the paper sheet can be discriminated. Upon the discrimination of each paper sheet, the same process is provided for each kind of paper sheets, while the same computing equations are used for the process. In this case, reading of the optical pattern for each paper sheet may be performed in a non-image-formation system. In addition, as the detection sensor used for the discrimination, an optical-magnetic composite sensor (or hybrid sensor) or optically transparent sensor (or optical reflection sensor) may be used.

According to the paper-sheet discrimination apparatus as described above, the reference pattern can be automatically prepared by inserting each genuine paper sheet into the apparatus, and a computing process for the discrimination can be commonly used for the banknotes and/or paper sheets of various countries and/or various denominations of money. Furthermore, this paper-sheet discrimination apparatus can eliminate a need for adjustment and maintenance as well as a need for automatic adjustment for the offset. Additionally, the same discrimination method can be applied to all of the sensors, such as a hybrid sensor(s), a path sensor(s), a color sensor(s) and the like, while eliminating any shear in the offset upon processing the data as well as eliminating variation of the gain. Accordingly, the detection system may be of a suitable non-image-formation type.

As alternative construction related to the banknote discrimination apparatus 10 according to the present invention, a banknote discrimination machine disclosed in JP3209765B, the entire contents of which are hereby incorporated herein by reference, can be mentioned.

Now, the banknote discrimination machine disclosed in JP3209765B will be described in more detail. This banknote discrimination machine is configured to discriminate each banknote, by detecting a pattern formed on the banknote.

More specifically, the banknote discrimination machine includes a reference data memory for each denomination, which is adapted for storing therein reference data of banknotes of a plurality of denominations of money to be discriminated; a pattern reading unit adapted for reading a pattern of the whole surface of each banknote as a pixel value for each channel; and an average-pixel-value calculation unit adapted for calculating an average value of the pixel value for each channel, as a channel average value, from the sum total and length of the pixel value for each channel.

The banknote discrimination machine further includes a zone-number calculation unit adapted for calculating the number of zones assigned, based on information on the length of each banknote and a predetermined number of samples, and assigning zone regions; a blocking unit adapted for obtaining the sum total of the pixel value in each zone region of each channel and an absolute value of the channel average value, as a blocking value; and a channel power value calculation unit adapted for obtaining the sum of absolute values of each difference, between the pixel value and the channel average value, obtained over the whole body in the longitudinal direction, for each channel, as a power value.

Furthermore, the banknote discrimination machine includes a normalization computing unit adapted for performing normalization by dividing the blocking value obtained by the blocking unit in each zone region, by the power value; a similarity-distance calculation unit adapted for obtaining a value of the sum total calculated by adding absolute values of each difference between normalized data obtained by the normalization computing unit and reference data in a predetermined direction for each denomination, over the whole surface of each banknote, as a similarity distance; and a pattern comparison unit adapted for comparing a plurality of similarity distances obtained by the similarity-distance calculation unit, with one another.

Moreover, the banknote discrimination machine includes a candidate denomination detection unit adapted for detecting a first candidate denomination that is the most similar denomination and a second candidate denomination that is a secondly most similar denomination, from a result obtained by the pattern comparison unit; a candidate-to-candidate distance detection unit adapted for obtaining a difference between the similarity distance of the first candidate denomination; the similarity distance of the second candidate denomination detected by the candidate denomination detection unit; and a denomination determination unit adapted for determining the banknote to be discriminated as the first candidate denomination, with the proviso that the similarity distance of the first candidate denomination detected by the candidate denomination detection unit is a predetermined value or less and that the difference detected by the candidate-to-candidate distance detection unit is a predetermined value or greater.

According to the banknote discrimination machine described above, whether or not the banknote to be discriminated is a counterfeit one or whether or not the banknote to be discriminated is determined as the most similar denomination can be judged, based on the similarity distance relative to the most similar denomination as well as on the similarity distance relative to the second most similar denomination. Therefore, with this banknote discrimination machine, each banknote can be securely discriminated without lowering a passing rate of the banknote. In this machine, some features in a counterfeit banknote are utilized for the discrimination, which are similar to its original genuine one as well as to a certain banknote which is similar to the original one. Namely, such a counterfeit banknote is fabricated by using the certain banknote having a pattern very similar to that of another banknote (i.e., the original banknote for the counterfeit one), while having a size slightly different therefrom. For instance, the counterfeit banknote is made by patching some piece of white paper to the certain banknote to make it have the same size as another banknote of a different denomination, or by cutting off a part of the certain banknote to render it the same size as another one of the different denomination.

As still another construction related to the banknote discrimination apparatus 10 according to the present invention, the paper-sheet discrimination apparatus as disclosed in JP3839207B, the entire contents of which are hereby incorporated herein by reference, can be mentioned.

Now, the paper-sheet discrimination apparatus disclosed in JP3839207B will be detailed. This paper-sheet discrimination apparatus is configured to discriminate the paper-sheets, such as banknotes, postage stamps, checks, bills, gifts and the like, wherein each paper sheet is irradiated with light of at least two wavelengths in order to discriminate the paper sheet, based on a signal from a light receiving sensor for detecting transmitted light coming from the paper sheet. The paper-sheet discrimination apparatus is also configured to prevent lowering of discrimination accuracy due to variation of output from the light receiving sensor.

More specifically, in this paper-sheet discrimination apparatus, the paper sheet is irradiated with the light of at least two wavelengths emitted from a light source, and the light transmitted through the paper sheet is then received by the light receiving sensor. In this way, the discrimination for each banknote can be performed, based on the signal sent from the light receiving sensor. The paper-sheet discrimination apparatus further includes a reference-value setting unit and a control unit. The reference-value setting unit is configured to control an amount of emission of the light source such that the output of the light receiving sensor will be a predetermined value, with a reference medium set between the light source and the light receiving sensor. Furthermore, the reference-value setting unit is configured to store each output value of the light receiving sensor after it directly receives the light from the light source that has been subjected to the control for the amount of emission, in a memory unit, as a reference value. The control unit is configured to control the output value of the light receiving sensor when it directly receives the light from the light source, prior to the beginning of the discrimination, such that the output value will be matched with the control reference value stored in the memory unit.

According to the paper-sheet discrimination apparatus of this type, since the automatic control for the emission amount of the light source of the plurality of wavelengths can be performed while all driving mechanisms are stopped, influence of noise can be significantly eliminated. In addition, since the emission amount of the light source of the plurality of wavelengths can be controlled such that the emission amount will be matched with the light-receiving control reference value stored in advance, the output of the light receiving sensor can be set at a predetermined level upon an initial setting with the plurality of wavelengths, as such adequately controlling the variation of the output level of the light receiving sensor between the plurality of wavelengths. Furthermore, since a diffusion plate is located between the light source of the plurality of wavelengths and the light receiving sensor, influence of the directivity, attachment angle and attachment distance of the light source can be substantially mitigated. Additionally, since light receiving elements and light receiving circuits are commonized into one system for the plurality of wavelengths while the output signal of the light receiving sensor can be finally separated corresponding to the plurality of wavelengths, fluctuations of the output of the light receiving sensor between the plurality of wavelengths due to variations of the light receiving elements and/or circuits among machines can be reduced.

As an authentication unit for the banknotes, provided in the banknote discrimination apparatus 10 according to the present invention, a magnetic material discrimination apparatus disclosed in JP4-52518B, the entire contents of which are hereby incorporated herein by reference, can be mentioned.

Next, the magnetic material discrimination apparatus for the paper sheets, disclosed in JP4-52518B will be detailed. This magnetic material discrimination apparatus is configured to discriminate a type of a magnetic material contained in the printing ink used for the paper sheets, such as checks, banknotes and the like. More specifically, the magnetic material discrimination apparatus includes a differential type magnetic head and a remanence detection type magnetic head, respectively provided upstream and downstream relative to a transport path of each paper sheet; and a magnet provided to the transport path running between the differential type magnetic head and the remanence detection type magnetic head. In addition, the magnetic material discrimination apparatus includes a division unit adapted for obtaining a maximum magnetic flux density outputted from the differential type magnetic head and a remanent magnetic flux density outputted from the remnance detection type magnetic head and calculate a ratio of these values; and a comparison and discrimination unit adapted for receiving the ratio calculated by the division unit and comparing the ratio with a set value, so as to discriminate the type of the magnetic material contained in the paper sheet.

In the magnetic discrimination apparatus as described above, the ratio between the maximum magnetic flux density and the remanent magnetic flux density of each paper sheet can be obtained, by detecting these values by using the heads for discrimination, while allowing the paper sheet to pass through the heads. Thereafter, by comparing the ratio with the preset value, the type of the magnetic material contained in the magnetic ink printed on the paper sheet can be discriminated. In this case, the maximum magnetic flux density and remanent magnetic flux density can be readily measured, wherein the ratio between the maximum magnetic flux density and the remanent magnetic flux density has a close relation with a shape of a specific hysteresis loop upon magnetization. Accordingly, the comparison between the ratio with the preset value leads to comparison of the hysteresis loops. In this way, the magnetic material of the paper sheet can be discriminated securely with ease while each paper sheet is transported on the path.

As another banknote authentication unit, which is based on fluorescent detection and provided in the banknote discrimination apparatus 10 according to the present invention, a filamentous fluorescent material detection apparatus disclosed in JP7-107506B, the entire contents of which are hereby incorporated herein by reference, can be mentioned.

Now, the filamentous fluorescent material detection apparatus disclosed in JP7-107506B will be detailed below. This detection apparatus is configured to efficiently detect filamentous fluorescent materials incorporated in a part of a banknote or the like. More specifically, the filamentous fluorescent material detection apparatus includes an excitation light source adapted for irradiating the filamentous fluorescent material incorporated in the banknote or the like, with excitation light; a selfoc lens array adapted for receiving fluorescent light emitted from the filamentous material excited by the excitation light; and a light receiving unit which is adapted for detecting light outputted from the selfoc lens array. As such, the detection apparatus of this type can detect the filamentous fluorescent material in a microscopic area of each banknote or the like.

According to the filamentous fluorescent material detection apparatus as described above, the detection of the filamentous fluorescent material is performed in the microscopic area of each banknote or the like, by using the selfoc lens array. Thus, the filamentous fluorescent material can be detected with a preferable S/N ratio, as such leading to further downsizing of the apparatus.

Additionally, as still another banknote authentication unit, which is based on fluorescent detection and provided in the banknote discrimination apparatus 10 according to the present invention, a fluorescent pattern detection apparatus disclosed in JP3139736B, the entire contents of which are hereby incorporated herein by reference, can be mentioned.

Next, the fluorescent pattern detection apparatus disclosed in JP3139736B will be detailed. This fluorescent pattern detection apparatus is adapted for detecting fluorescent light emitted from a fluorescent material when it is irradiated with ultraviolet rays, in the case of determining authenticity of each paper sheet, such as the banknote or the like, containing the fluorescent material. Specifically, the fluorescent pattern detection apparatus can monitor the amount of ultraviolet rays radiated onto the fluorescent material.

More specifically, in the fluorescent pattern detection apparatus, the fluorescent material to be detected, such as the banknote or the like, is irradiated with the excitation light emitted from the excitation light source of an ultraviolet wavelength range. Consequently, fluorescent light will be emitted from the fluorescent material. Then, the so-emitted fluorescent light passes through an optical system and is detected by a photo-detector, so that a pattern of the fluorescent material can be detected. In this fluorescent pattern detection apparatus, the optical system includes an optical filter, which can transmit light within a visible-light wavelength range and shut off light within a shorter wavelength range from the ultraviolet rays. Thus, the pattern of the fluorescent material can be detected by detecting the light within the visible-light wavelength range that can pass through the optical filter, by using the photo-detector. In the fluorescent pattern detection apparatus, the optical system further includes a fluorescent light emission element adapted for emitting the fluorescent light, when receiving light within the ultraviolet wavelength range from the excitation light source, and a fluorescent light receiving element adapted for receiving the fluorescent light emitted from the fluorescent light emission element.

According to this fluorescent pattern detection apparatus, the optical system includes the fluorescent light emission element adapted for emitting the fluorescent light, when receiving reflected light containing light component in the ultraviolet wavelength range from the material to be detected, and the fluorescent light receiving element adapted for receiving the fluorescent light emitted from the fluorescent light emission element. Therefore, fluctuations of the amount of light of the reflected light, especially those of the amount of light emitted from the excitation light source, can be detected, by monitoring the amount of light emitted from the fluorescent light emission element by using the fluorescent light receiving element. Accordingly, if the amount of light emitted from the fluorescent light emission element, which is received by the fluorescent light receiving element, is fluctuated, it can be seen that it is difficult to accurately grasp the fluorescent pattern of the material to be detected. This can allow a person to take some proper measures related to this pattern detection, such as exchange of the excitation light source or the like. Additionally, the fluorescent light receiving element adapted for receiving light within the visible-light wavelength range emitted from the fluorescent light emission element is quite low-priced, as compared with, for example, a photo-diode that is especially sensitive to the ultraviolet wavelength range. Therefore, such a fluorescent light receiving element can significantly contribute to control for the production cost of the detection apparatus.

As to the thread sensor of the banknote discrimination apparatus 10 according to the present invention, a metal thread sensor disclosed in JP3347900B, the entire contents of which are hereby incorporated herein by reference, can be mentioned.

Hereinafter, the metal thread detection apparatus for the paper sheets, disclosed in JP3347900B, will be detailed. This metal thread detection apparatus is configured to detect the metal thread incorporated in the paper sheet. Specifically, in the metal thread detection apparatus, a set or multiple sets of detection electrode plates and grounding electrode plates, respectively arranged in the same plane while constituting condenser sections, are located, with a predetermined interval, along a transport path for the paper sheet incorporating the metal thread. In this case, the detection electrode plates and grounding electrode plates are positioned to be close to both of the front and rear faces of the paper sheet, respectively, with the respective electrode plates of the same polarity being opposed. In this way, an electrostatic sensor (or sensors) can be created by driving the opposed electrode plates of the same polarity respectively, with an oscillation output of the same phase. Consequently, presence or absence of the metal thread can be detected by analyzing a signal from each electrostatic sensor.

According to this metal thread detection apparatus, the condenser sections are constituted by arranging the detection electrode plates and grounding electrode plates in the same plane, and the electrostatic sensor (or sensors) can be created, by arranging these electrode plates with the predetermined interval such that the respective electrode plates of the same polarity are opposed relative to one another, as well as by driving the opposed electrode plates of the same polarity respectively with the oscillation output of the same phase. Therefore, an electric field of the same strength can be created with symmetrical distribution of the electric field formed between the opposed electrode plates, thereby to produce each detection output that is immune to influence due to the position through which the paper sheet passes. In addition, since the condenser (or condensers) is not constituted between the opposed electrode plates, but is constituted between the electrode plates arranged in the same plane, turbulence of the electric field that would be otherwise caused by insertion or retraction of each paper sheet relative to an electrode detection section can be prevented. As such, occurrence of some unwanted peak wave form upon the insertion or retraction of each paper sheet relative to the electrode detection section can be avoided.

As another tread sensor used for the banknote discrimination apparatus 10 according to the present invention, a capacitance sensor disclosed in JP3657342B, the entire contents of which are hereby incorporated herein by reference, can be mentioned.

Next, the capacitance sensor disclosed in JP3657342B will be described. The capacitance sensor is used for detecting features of each paper sheet. More specifically, in this capacitance sensor, at least one set of the detection electrode plate and grounding electrode plate, respectively arranged in the same plane while constituting together the condenser section, are located on a top face of a rectangular parallelepiped container provided with its detection face of which one side is shorter that the shorter side shorter than each short side of the paper sheet. In this case, the detection electrode plate and grounding electrode plate are located along the transport path for each paper sheet and positioned to be close to the front face or rear face of each paper sheet, respectively. These electrode plates are configured to be driven with a predetermined oscillation output applied therebetween.

According to such a capacitance sensor, the sensor can be greatly downsized, as well as the change of permittivity of the paper sheet can be detected locally with high sensitivity. Namely, with such downsizing, works for attachment and adjustment as well as works for implementation, such as those for maintenance and exchange, can be transported out readily and stably, as well as the detection can be performed with higher sensitivity. In addition, works for checking the number of paper sheets, presence or absence of the thread and/or tape can be significantly facilitated.

As still another thread sensor related to the banknote discrimination apparatus 10 according to the present invention, a paper-sheet discrimination sensor disclosed in JP2004-280367A, the entire contents of which are hereby incorporated herein by reference, can be mentioned.

Now, the paper-sheet discrimination sensor disclosed in JP2004-280367A will be described. This paper-sheet discrimination sensor is configured to transport each paper sheet, such as the banknote, between electrodes opposed to each other and detect changes of the capacitance between the opposed electrodes with high accuracy, thereby discriminating fitness of each paper sheet. More specifically, a sensor body is formed by embedding each electrode in a dielectric, and an electrically conductive material having a surface resistance of $10^4$ to $10^9\Omega$ is layered on a surface of the sensor body on the side by which each banknote passes.

According to the paper-sheet discrimination sensor as described above, the mutual influence between the electrodes can be adequately suppressed, and external noise, such as static electricity, can be substantially eliminated. Furthermore, this paper-sheet discrimination sensor can be produced with ease and discriminate even tiny tapes and seals, securely and accurately.

As still another thread sensor used for the banknote discrimination apparatus according to the present invention, the metal thread detection apparatus disclosed in JP2002-

277441A, the entire contents of which are hereby incorporated herein by reference, can be mentioned.

Hereinafter, the metal thread detection apparatus disclosed in JP2002-277441A will be detailed. This metal thread detection apparatus is configured for detecting the metal thread containing at least some metal ingredient, among threads incorporated in the paper sheet, such as the banknote, and used for preventing forgery, and comprises a metal thread detector, an oscillation circuit, a wave detection circuit, and a differential amplifier. The metal thread detector has a structure in which two yokes, each having a hollow rectangular cross section, are stacked one on another. In this structure, one of the yokes is positioned on one side facing the paper sheet, with a pair of detection coils wound around the one yoke, while the other yoke is positioned on the other side spaced away from the paper sheet in order to avoid interference caused by the paper sheet, with a pair of reference coils wound around the other yoke. In such a manner, the inductance of the detection coils is matched with the inductance of the reference coils. The oscillation circuit is configured to input a high frequency within a range of from 4 to 12 MHz to a primary coil of the pair of detection coils as well as to a primary coil of the pair of reference coils. The wave detection circuit comprises two equivalent circuits and is adapted for converting an alternating current signal outputted from the metal thread detector into a direct current signal. One of the two equivalent circuits constituting the wave detection circuit is connected with a secondary coil of the detection coils as well as connected with one input terminal of the differential amplifier. The other of the equivalent circuits constituting the wave detection circuit is connected with a secondary coil of the reference coils as well as connected with the other input terminal of the differential amplifier. The differential amplifier is configured for operationally amplifying and outputting each difference of signals inputted from each of the two equivalent circuits constituting the wave detection circuit.

The metal thread detection apparatus as described above has a function as a magnetic detector comprises the pair of coils, as a means that can also detect the capacitance. In such a structure, the input of the high frequency to both of the primary coils enables the detection based on changes of the capacitance. Accordingly, a composite detection function consisting of a function for such capacitance-change-based detection and an original function for the magnetic flux detection to be performed by the fundamental magnetic detector can be achieved. In addition, in the metal thread detection apparatus, the two coils of the same specification are provided, in which the one of the coils is used as the detection coil and arranged in an opened or exposed state, while the other coil is used as the reference coil and arranged in a closed state. In this way, with detection of differences between outputs from the two coils, fluctuations of the outputs caused by changes of environmental conditions, such as noise or the like, can be adequately corrected and cancelled. Thus, the metal thread can be detected with higher accuracy.

As yet still another thread sensor used for the banknote discrimination apparatus 10 according to the present invention, a security thread detection apparatus disclosed in JP2566959B, the entire contents of which are hereby incorporated herein by reference, can be mentioned.

Next, the security thread detection apparatus disclosed in JP2566959B will be detailed. This security thread detection apparatus includes a transport unit adapted for transporting each inserted paper sheet along a transport path up to a processing part for processing the paper sheet. In addition, the security thread detection apparatus includes transmitter-receiver units provided, in the middle of the transport path, such that they are opposed to each other across the paper sheet being transported. The transmitter-receiver units respectively include multiple pairs of transmitter antennae and receiver antennae, each operated independently. The plurality of transmitter antennae are driven with the same high frequency signal, and high frequency electric waves respectively radiated from the transmitter antennae are received separately by the plurality of opposite receiver antennae. Furthermore, the security thread detection apparatus includes a detection unit, which is adapted for detecting existence of a security thread in each paper sheet, by obtaining each detection output and by comparing detection signals detected by the respective receiver antennae with a preset reference voltage.

According to such a security thread detection apparatus, the security thread can be detected, by receiving the electric waves radiated from the respective transmitter antennae to each transported paper sheet by using the respective receiver antenna, so as to observe attenuation of the electric waves caused by reflection and absorption due to the security thread. Since each operation for each paper sheet is performed, based on a result of such detection, the determination of authenticity of each paper sheet and other associated processes can be performed securely and accurately. Therefore, the security thread formed from any material can be detected with relatively simple construction, without any influence, such as by patterns or the like of the paper sheet.

As a system adapted for discriminating the authenticity of the banknote by reading a microcode printed thereon, which is related to the banknote discrimination apparatus 10 according to the present invention, a microcode reading apparatus disclosed in JP3897182B, the entire contents of which are hereby incorporated herein by reference, can be mentioned.

Now, the microcode reading apparatus disclosed in JP3897182B will be described. This microcode reading apparatus is configured to optically detect a microcode printed on the banknote or the like and discriminate the authenticity of the banknote or the like. Specifically, the microcode reading apparatus includes a glass plate having a surface constituting a transport path for banknotes; a frame-like support plate located under the glass plate, having an opening at a central portion, and including a plurality of LED elements provided with a predetermined space on both front and rear faces of a portion around the opening; a light-guide unit adapted for condensing light emitted from each LED element provided to the support plate, and irradiating a portion of the banknote, on which the microcode is printed, with the condensed light, while the banknote is transported on the glass plate; a light detector adapted for detecting light reflected from the portion, on which the microcode is printed, and the reflected light being a part of the light condensed by the light-guide unit; and a light transmission unit adapted for transmitting the reflected light coming from the portion, on which the microcode is printed, after passing through the opening, to the light detector.

In this way, a highly sensitive microcode reading apparatus can be provided, which can take a significantly downsized and thinned form and irradiate a region that is matched with a printed pattern of the microcode to be read, with light emitted from a light source.

As a structure for reading the banknote serial number, which is used for the banknote discrimination apparatus 10 according to the present invention, a paper-sheet-number identification apparatus disclosed in JP3667905B, the entire contents of which are hereby incorporated herein by reference, can be mentioned.

Next, the paper-sheet-serial-number identification apparatus disclosed in JP3667905B will be described below. This serial number identification apparatus is configured to correctly identify each number of the paper sheets, such as the banknotes, checks and the like. Specifically, this serial number identification apparatus includes a first sensor adapted for reading an image of each paper sheet; a second sensor of a higher resolution than that of the first sensor and adapted for reading a serial number included in the image of the paper sheet; a nonvolatile memory adapted for storing parameters for discrimination therein; and a discrimination and computing unit adapted for controlling the entire system in cooperation with a ROM and a RAM as well as for discriminating the paper sheet, based on image data of the first and second sensors as well as on the parameters. Thus, each number of the paper sheets can be discriminated by using this serial number identification apparatus.

This number identification apparatus can achieve higher speed serial number identification, without being influenced by any state in which the paper sheet is transported. Namely, this apparatus can securely identify each paper sheet, without being affected by any positional shift of letters and/or shift of printing, by an adequate search for each letter or figure constituting together each serial number of the paper sheet. In addition, this apparatus can provide identification for each paper sheet, which can eliminate influence, such as caused by incomplete printing of the letters, by utilizing a proper learning function of weighting coefficients.

As another structure for reading each banknote serial number, which is used for the banknote discrimination apparatus 10 according to the present invention, a banknote serial number reading apparatus disclosed in JP2004-213559A, the entire contents of which are hereby incorporated herein by reference, can be mentioned.

Next, the banknote serial number reading apparatus disclosed in JP2004-213559A will be detailed below. This banknote serial number reading apparatus is configured to read the number printed on each banknote, and specifically it can help determination and/or identification for the banknote serial number, in the case in which a scribbled writing and/or dirt is present on a part of the banknote serial number and/or in the case in which some frame error occurs. More specifically, the banknote serial number reading apparatus is configured to identify a letter of each digit of the banknote serial number, based on image data obtained from a printed region for the number, as well as configured to replace each letter that cannot be completely be identified, with an error letter for indicating an identification error, thereby to output a compensated banknote serial number, in which such an error letter (or error letters) is added to the other completely identified letters, as a result of identification.

According to such a banknote serial number reading apparatus, upon determining the printed region for each banknote serial number and identifying each letter constituting together the banknote serial number, based on the image data cut out by a scanning operation for reading the banknote, the result of identification is outputted, in which only the letter that cannot be completely identified is replaced with the error letter for indicating the identification error. Therefore, even in the case in which scribbled writing and/or dirt is present on a part of the banknote serial number and/or in the case in which some frame error occurs, each identification error can be indicated by a very simple method of replacing each letter that cannot completely be identified, with the error letter, while the remaining complete letters of the banknote serial number can be securely identified. Thus, a person that deposited a certain banknote can be specified, based on such normally identified letters other than the error letters of the banknote serial number as well as on an actual banknote serial number.

As still another structure for reading the banknote serial number, which is used for the banknote discrimination apparatus 10 according to the present invention, the banknote serial number reading apparatus as disclosed in JP2004-213560A, the entire contents of which are hereby incorporated herein by reference, can be mentioned.

Now, the banknote serial number reading apparatus disclosed in JP2004-213560A will be detailed below. This banknote serial number reading apparatus is configured to read the number printed on each banknote, and specifically it can accurately read the banknote serial number that is different, in the color of letters of the number and color of the background, for each banknote type. More specifically, in this banknote serial number reading apparatus, the denomination and a transport direction of each banknote are respectively identified by a denomination discrimination part when the banknote passes though the denomination discrimination part, one sheet for each operation, and the banknote having passed through the denomination discrimination part is then transported to a banknote escrow part. Thereafter, the banknote is in turn transported in a reverse direction from the escrow part and passes through a number reading part. During this path of the banknote, the number reading part will selectively drive two light sources respectively adapted for emitting light of different colors, based on information about the denomination and direction (or denomination and direction information) transmitted from the denomination discrimination part, thereby scanning and reading a portion, on which the serial number is printed on the transported banknote, by using an image sensor. In this way, the serial number printed on each banknote can be read, while the color of light emitted from each light source is selectively changed, corresponding to the denomination of the banknote.

According to this banknote serial number reading apparatus, since each banknote can be scanned and read, by selectively driving the two light sources respectively adapted for emitting light of different colors, based on the information about the denomination and direction of the banknote, a binary image of the banknote serial number can be clearly determined, with proper dropout of the background image, for each denomination. Therefore, by utilizing such binary image data, the banknote serial number can be accurately identified for each denomination.

The invention claimed is:

1. A first banknote discrimination apparatus adapted for discriminating banknotes transported to the first banknote discrimination apparatus individually, comprising:

a body formed in a box-shape, the body including two transport units which form a banknote transportation path therebetween, and a timing sensor for detecting arrival of the banknote at the first banknote discrimination apparatus;

a plurality of sensors provided along the banknote transportation path, each detachably provided to the body and adapted for detecting each banknote and being enabled to be replaceable with a dummy member corresponding to the sensor; and a control unit adapted for discriminating each banknote, based on detection information detected by each of the sensors;

wherein the body further includes a fastening member for securing each of the sensors and each of the dummy members to the body, the body is constructed such that the sensors are able to be selectively replaced with the dummy member corresponding to the sensor, the dummy member having substantially the same shape as the sensor, at least on the side of the transport path and being unable to detect the banknote, the control unit includes a CPU (Central Processing Unit), a program memory provided to the CPU, and a FGPA (Field Programmable Gate Array) connected with the CPU, and the CPU rewrites a program of the FGPA to update a control algorithm corresponding to the sensor when the sensor is removed from the body to be replaced with the dummy member, or corresponding to another sensor which is newly mounted to the body when the dummy member mounted to the body is replaced with another sensor.

2. The first banknote discrimination apparatus according to claim 1, wherein the dummy member is composed of a plastic material.

3. The first banknote discrimination apparatus according to claim 1, wherein the dummy member is mounted to the transport unit from the rear side thereof.

4. The first banknote discrimination apparatus according to claim 1, wherein the sensors include at least one of a magnetic sensor, a fluorescent sensor, a thread sensor and an optical line sensor.

5. A method for developing a recognition algorithm and an optical line sensor control algorithm for a second banknote discrimination apparatus, the method comprises:

preparing the first banknote discrimination apparatus according to claim 1, in which the control unit is mounted in a transport unit; and utilizing the prepared first banknote discrimination apparatus to develop the recognition algorithm and the optical line sensor control algorithm;

wherein the second banknote discrimination apparatus comprises a pair of optical line sensors, each of optical line sensors being separately disposed and a banknote transport path being provided therebetween, and a functional-block-based circuit, wherein the formed second banknote discrimination apparatus does not comprise the body.

6. A method for developing a recognition algorithm and an optical line sensor control algorithm for a second banknote discrimination apparatus, the method comprises:

preparing the first banknote discrimination apparatus according to claim 1, in which the control unit is stored in a structural unit; and utilizing the first banknote discrimination apparatus to develop the recognition algorithm and the optical line sensor control algorithm;

wherein the second banknote discrimination apparatus comprises a pair of transport units, a banknote transport path is provided therebetween, each of transport units includes an optical line sensor, and the second banknote discrimination apparatus further comprising a functional-block-based circuit provided outside the transport units.

7. A method for discriminating a banknote by a banknote discrimination apparatus, in which the banknote discrimination apparatus is adapted for discriminating banknotes transported thereto individually and includes a body comprising two transport units which form a banknote transport path therebetween, a timing sensor for detecting arrival of the banknote thereat, a plurality of sensors, each detachably provided to the body and adapted for detecting each banknote, and a control unit adapted for discriminating each banknote, based on detection information detected by each sensor, the control unit includes a CPU (Central Processing Unit), a program memory provided to the CPU, and an FGPA (Field Programmable Gate Array) connected with the CPU, and the body is constructed such that the sensors are able to be replaced with a dummy member corresponding to the sensor, the dummy member having substantially the same shape as the sensor, at least on the side of the transport path and being unable to detect the banknote, the body further including a fastening member which secures each of the sensors or the dummy members to the body, the method comprising:

mounting or removing one of the plurality of sensors to the body;

rewriting a program of the FGPA to update a control algorithm corresponding to the sensor when the sensor is removed from the body to be replaced with the dummy member, or corresponding to another sensor which is newly mounted to the body when the dummy member mounted to the body is replaced with the another sensor; and discriminating a banknote, by using the detection information detected by the sensors, and the control algorithm corresponding to which is updated and mounted to the body.

* * * * *